US006687599B2

(12) United States Patent
Lee

(10) Patent No.: US 6,687,599 B2
(45) Date of Patent: Feb. 3, 2004

(54) METHOD AND APPARATUS FOR CALCULATING AIR-MASS DRAWN INTO CYLINDERS, AND METHOD AND APPARATUS FOR CONTROLLING FUEL

(75) Inventor: Jae-Hyung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/386,077

(22) Filed: Mar. 10, 2003

(65) Prior Publication Data

US 2004/0002807 A1 Jan. 1, 2004

(30) Foreign Application Priority Data

Jun. 29, 2002 (KR) ................................ 10-2002-0037443

(51) Int. Cl.[7] .................................................. B60T 7/12
(52) U.S. Cl. ....................... 701/104; 73/118.2; 123/494
(58) Field of Search ................................ 701/101, 103, 701/104, 105; 73/118.2; 123/494

(56) References Cited

U.S. PATENT DOCUMENTS 5,522,365 A * 6/1996 Milunas et al. ............. 123/480
5,698,780 A * 12/1997 Mizutani et al. ........... 73/118.2
6,044,643 A * 4/2000 Ittner et al. .................... 60/289
6,115,664 A * 9/2000 Cullen et al. ............... 701/102
6,170,475 B1 * 1/2001 Lewis et al. ........... 123/568.21
6,189,524 B1 * 2/2001 Zhang et al. ............... 123/690
6,363,316 B1 * 3/2002 Soliman et al. ............. 701/104
6,453,897 B1 * 9/2002 Kanno ........................ 123/684
6,460,409 B1 * 10/2002 Soliman et al. ............ 73/118.2
6,564,785 B2 * 5/2003 Iwasaki ................. 123/568.21

FOREIGN PATENT DOCUMENTS

JP 63-012876 1/1988
JP 2001-234798 8/2001

* cited by examiner

*Primary Examiner*—John Kwon
(74) *Attorney, Agent, or Firm*—Pennie & Edmonds LLP

(57) ABSTRACT

There is a time delay between the moment of fuel injection and the moment when air with the injected fuel is drawn into cylinders. At the time of fuel injection, air-mass that will be drawn into cylinders after the delay time is estimated on the basis of expectation values of throttle opening, air-mass drawn into an intake-manifold, and intake-manifold pressure. Fuel amount is in turn calculated based on the estimated air-mass.

14 Claims, 7 Drawing Sheets

METHOD AND APPARATUS FOR CALCULATING AIR-MASS DRAWN INTO CYLINDERS, AND METHOD AND APPARATUS FOR CONTROLLING FUEL

FIELD OF THE INVENTION

Generally, the present invention relates to a method and apparatus for mixing air and fuel in an engine of an automobile. More particularly, the present invention relates to a method and apparatus for estimating air-mass inflow into cylinders based on a current throttle setting and also to controlling the amount of fuel input into cylinders based on the estimated air-mass.

BACKGROUND OF THE INVENTION

Gasoline engines generate power by burning fuel in a combustion chamber. A throttle valve regulates the power output of such gasoline engines. The throttle valve controls the amount of air drawn into the engine. The fuel injected into the engines depends on the amount of air-mass drawn into the engine. Therefore, in order to control the amount of fuel injected into the engine, the amount of air-mass drawn into the combustion chamber must be detected.

Commonly, to detect the amount of air-mass drawn into an engine a Manifold Absolute Pressure (MAP) sensor is used. A MAP sensor detects the pressure and temperature in an intake-manifold and converts the value to an air-mass valve.

FIG. 1 shows a graph illustrating how an output signal of a MAP sensor changes according to throttle valve position changes. Typically, as in FIG. 1, when a throttle valve is operated the pressure in an intake-manifold changes accordingly. As a consequence, the air-mass drawn into a combustion chamber through the intake-manifold also changes accordingly. Therefore, calculation of an appropriate amount of fuel to be injected into a cylinder at each fuel injection period becomes difficult. This results in an excess of noxious exhaust gas because of improper and incomplete burning of the fuel.

In the conventional system, in order to cope with such a situation, (1) a change rate of each of the throttle opening and the intake-manifold pressure is calculated, (2) a first fuel correction value is calculated when the change rate of the throttle opening is greater than a first predetermined value, (3) a second fuel correction value is calculated when the change rate of the intake-manifold pressure becomes greater than a second predetermined value, and (4) such first and second fuel correction values are added to a base amount of fuel calculated based on air-temperature, engine speed, and a throttle setting.

However, a correction formula, for calculating fuel amount correction values, must be established with respect to each of the throttle opening change rates and the intake-manifold pressure change rate. Furthermore, a method for calculating the appropriate amount of fuel must be altered to adopt the established correction formula because newly adopting the correction formula may affect each of the throttle opening dependency, engine speed dependency, and air temperature dependency in an original formula for calculating the amount of fuel.

To appropriately adopt the consequent changes, a lot of experimentation is required. In turn, the experimentation substantially increases the time and cost involved in developing an appropriate engine control method. This experimentation also must be performed for each engine under investigation. Furthermore, the system does not take into consideration and change as the engine ages and the tolerances with the engine change.

One of the principal factors that result in complex relations between parameters for correcting the amount of fuel injected into the cylinders is the temporal discrepancy. The temporal discrepancy occurs between a moment at which an intake-manifold pressure is detected and a moment that the correspondingly injected fuel becomes mixed with the air and together is drawn into the combustion chambers.

FIG. 2 shows a typical period required for the injected fuel to become mixed with air and drawn into the combustion chambers. A temporal discrepancy typically lasts for one cycle of crankshaft rotation. This period occurs between a moment when an intake-manifold pressure is detected and a corresponding fuel amount is calculated and a moment that the injected fuel gets into the combustion chamber for burning. Therefore, under an abrupt change of the throttle opening, such as under hard acceleration or deceleration, precise control of the fuel is very difficult according to the conventional system.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention provides for estimating the air-mass drawn into cylinders at an actual point of being drawn into the cylinders. An exemplary system for estimating cylinder intake air-mass of the present invention includes a throttle opening detector for detecting a throttle setting. An engine speed detector for detecting the engine speed and an intake-manifold pressure detector for detecting intake-manifold pressure. Further included is an intake air temperature detector for detecting the temperature of the air drawn into an intake manifold and an electronic control unit for calculating air-mass drawn in to cylinders based on signals of the throttle opening detector, the engine speed detector, the intake-manifold pressure detector, and the intake air temperature detector. Also, the electronic control unit is programmed to execute instructions for an exemplary method for estimating air-mass drawn into cylinders.

An exemplary method for estimating the air-mass drawn into cylinders includes detecting a current throttle opening TPS and detecting a current engine speed RPM. Detecting an air mass $M_{mani}$ currently drawn into an intake-manifold and calculating a delay period Δt from injecting fuel to a predetermined target moment. Calculating an expectation value $E\_TPS_{\Delta t}$ of a throttle opening after the delay period Δt and an expectation value $E\_M_{mani,\Delta t}$ of air-mass drawn into the intake-manifold after the delay period Δt on the basis of the expectation value $E\_TPS_{\Delta t}$ of throttle opening. Further included are steps of calculating an expectation value $E\_P_{mani,\Delta t}$ of the intake-manifold pressure after the delay period Δt on the basis of the expectation value $E\_M_{mani,\Delta t}$ of air-mass drawn into the intake-manifold and calculating an expectation value $E\_M_{cyl,\Delta t}$ of air-mass drawn into cylinders after the delay period Δt on the basis of the expectation value $E\_P_{mani,\Delta t}$.

In a further embodiment, the calculating expectation value $E\_TPS_{\Delta t}$ of the throttle opening calculates the expectation value $E\_TPS_{\Delta t}$ on the basis of Newton's difference method to a predetermined order difference term.

In another further embodiment, the calculating expectation value $E\_TPS_{\Delta t}$ of throttle opening includes calculating a first order difference DTPS of the throttle opening and calculating a second order difference ΔDTPS of the throttle opening. Calculating the expectation value $E\_TPS_{\Delta t}$ of the throttle opening on the basis of the equation $$E\_TPS_{\Delta t} = TPS + \frac{DTPS}{\delta t} \times \Delta t + \frac{1}{2}\frac{\Delta DTPS}{(\delta t)^2} \times (\Delta t)^2,$$

wherein δt denotes a time period between detecting moments of a current and a previous throttle openings TPS and $TPS_{prec}$.

In a yet another further embodiment, the calculating expectation value $E\_M_{mani,\Delta t}$ of air-mass drawn into the intake-manifold includes calculating a base mass $M_{base,\Delta t}$ passing through the throttle valve on the basis of an engine speed RPM and the expectation value $E\_TPS_{\Delta t}$ of throttle opening. Detecting an air temperature $T_{in}$ drawn into the intake-manifold and calculating a correction coefficient $C_T$ corresponding to the intake air temperature $T_{in}$. Calculating a correction coefficient $C_P$ corresponding to a pressure ratio of pressure before and after the throttle valve after the delay time Δt. Also, calculating the expectation value $E\_M_{mani,\Delta t}$ of air-mass drawn into the intake-manifold by modifying the base mass $M_{base,\Delta t}$ based on the correction coefficients $C_T$ and $C_P$.

In a still further embodiment, the calculating a correction coefficient $C_T$ calculates the correction coefficient $C_T$ as a value of $$\sqrt{\frac{T_0}{T_0 + T_{in}}}$$

on the basis of a predetermined temperature $T_0$ and the intake air temperature $T_{in}$.

In another still further embodiment, the calculating of a correction coefficient $C_P$ corresponding to a pressure ratio includes calculating a temporary expectation value $E\_M_{temp}$ of air-mass drawn into the intake-manifold after the delay period Δt by extrapolation. Further included is the steps of calculating an expectation value $E\_P_{TH,\Delta t}$ of pressure before the throttle valve on the basis of the temporary expectation value $E\_M_{temp}$ and calculating an expectation value $E\_P_{temp}$ of pressure in the intake-manifold after the delay time Δt by extrapolation.

In yet another further embodiment, the calculating of a correction coefficient $C_P$ corresponding to a pressure ratio calculates the correction coefficient $C_P$ on the basis of a function which monotonically decreases above a threshold pressure ratio and converges to 0 at a predetermined pressure ratio.

In still yet another further embodiment, the calculating of an expectation value $E\_P_{mani,\Delta t}$ of intake-manifold pressure after the delay period Δt includes detecting a current intake-manifold pressure $P_{mani}$ and calculating intake-manifold pressure change $\Delta P_{mani}$ as a value of "$(E\_M_{mani,\Delta t} - M_{mani}) \times R \times T_{in} / V_s$." Further included is the step of calculating the expectation value $E\_P_{mani,\Delta t}$ of the intake-manifold pressure by adding the detected current intake-manifold pressure $P_{mani}$ and the pressure change $\Delta P_{mani}$.

In a yet another further embodiment, the calculating expectation value $E\_M_{cyl,\Delta t}$ of cylinder intake air-mass calculates the expectation value $E\_M_{cyl,\Delta t}$ of cylinder intake air-mass as a value of the equation $E\_M_{cyl,\Delta t} = K(RPM) \times E\_P_{mani,\Delta t} + P_{rig}(RPM)$, wherein $P_{rig}(RPM)$ and $K(RPM)$ are predetermined functions of engine speed RPM.

An exemplary fuel control system of an engine of the present invention includes a throttle opening detector for detecting the throttle opening or setting and an engine speed detector for detecting the engine speed. Further included is an intake-manifold pressure detector for detecting intake-manifold pressure and an intake air temperature detector for detecting the temperature of the air drawn into the intake manifold and injectors for injecting fuel into the engine. An electronic control unit for calculating the amount of fuel to be injected into the cylinder is based on signals of the throttle opening detector, the engine speed detector, the intake-manifold pressure detector, and the intake air temperature detector. Furthermore, the electronic control unit drives the fuel injectors based on the calculated fuel amount, wherein the electronic control unit is programmed to execute instructions for an exemplary fuel control method of an engine described below.

An exemplary fuel control method of an engine of the present invention includes determining if a predetermined condition is satisfied and estimating an expectation value $E\_M_{cyl,\Delta t}$ of cylinder intake air-mass after the delay period Δt according to an exemplary method for estimating air-mass drawn into cylinders described above. Further steps include calculating a fuel amount based on the estimated expectation value $E\_M_{cyl,\Delta t}$ and driving fuel injectors based on the calculated fuel amount.

In a further embodiment, the predetermined condition is satisfied when an interval has passed after starting the engine and there is no malfunctioning of a throttle opening detector, an engine speed detector, an intake-manifold pressure detector, or an intake air temperature detector. Furthermore, the change rate of the throttle opening is greater than a first predetermined change rate, and the change rate of the intake-manifold pressure is greater than a second predetermined change rate.

It is preferable that the further steps of determining if a difference between the estimated expectation value $E\_M_{cyl,\Delta t}$ and a current air-mass drawn into the intake-manifold $M_{mani}$ is greater than a predetermined value is included. Also, when the difference is greater than a predetermined value, the calculating of the amount of fuel is based on the estimated expectation value $E\_M_{cyl,\Delta t}$.

BRIEF DESCRIPTION OF THE DRAWINGS

The accompanying drawings, which are incorporated in and constitute a part of the specification, help illustrate the invention, and, read together with the description, serve to explain the principles of the invention.

DETAILED DESCRIPTION OF THE PREFERRED EMBODIMENTS

Figure 1:
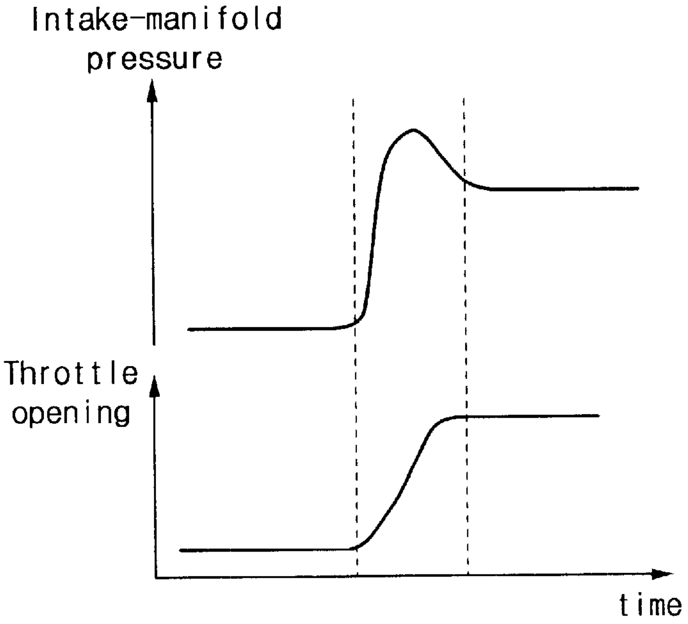
FIG. 1 is a graph illustrating how an output signal of a MAP sensor changes according to changes in a throttle valve opening.
Figure 2:
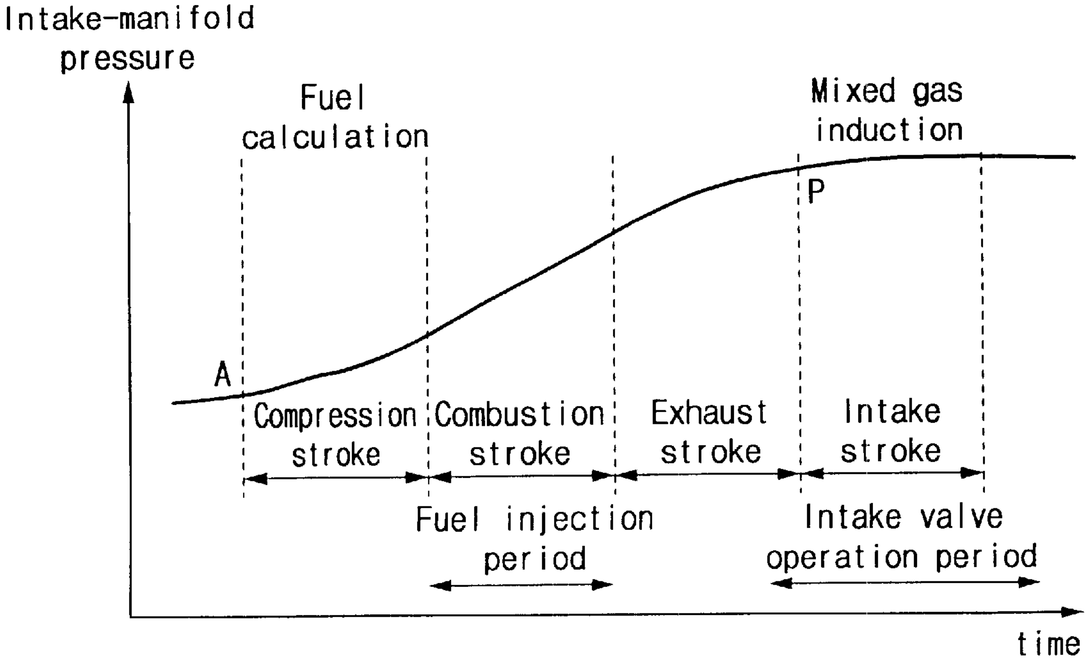
FIG. 2 is a graph showing a period for injecting and mixing fuel with air in relation to a rotation of a crankshaft of an engine.
Figure 3:
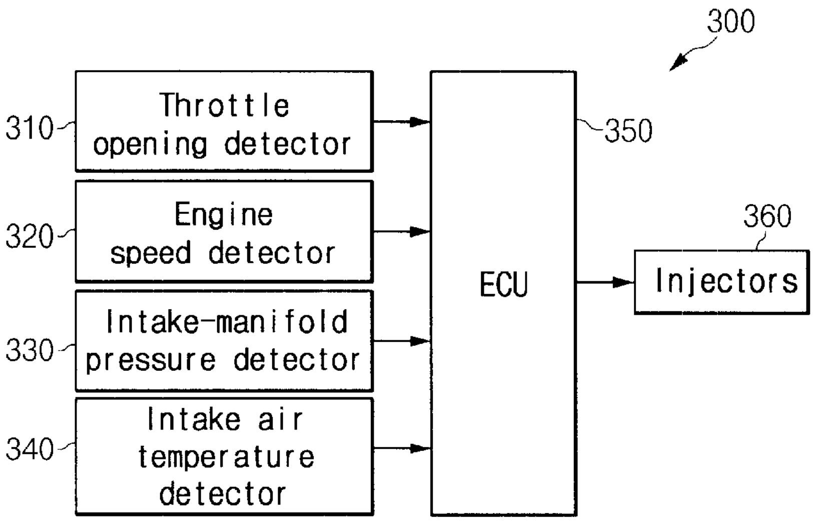
FIG. 3 is a block diagram of a system for estimating air-mass and a system for controlling fuel according to an embodiment of the present invention.

FIG. 3 shows a system 300 according to an embodiment of the present invention that includes a throttle opening detector 310 for detecting throttle opening and an engine speed detector 320 for detecting engine speed (RPM). Further included is an intake-manifold pressure detector 330 for detecting intake-manifold pressure and an intake air temperature detector 340 for detecting the temperature of the air drawn into an intake manifold. Also included are injectors 360 for injecting fuel into the engine and an electronic control unit (ECU) 350 for calculating air-mass drawn into cylinders. The air-mass is based on signals of the throttle opening detector 310, the engine speed detector 320, the intake-manifold pressure detector 330, and the intake air temperature detector 340.

According to an embodiment of the present invention the ECU 350 calculates the air-mass according to a method for estimating air-mass drawn into the combustion chambers. The ECU 350 further calculates the amount of fuel to be injected into the cylinders based on the estimated air-mass and accordingly drives the fuel injectors 360 based on the calculated fuel amount. The detectors 310–330 and the injectors 360 are common detectors and injectors known in the art.

The ECU 350 can be realized by one or more processors activated by preprogrammed software. The preprogrammed software can be programmed to perform each step of a method for estimating air-mass drawn into combustion chambers as well as a fuel control method of an engine according to a preferred embodiment of this invention. Furthermore, the ECU 350 is equipped with a memory to store values of parameters for later calculations and comparisons.

Figure 4:
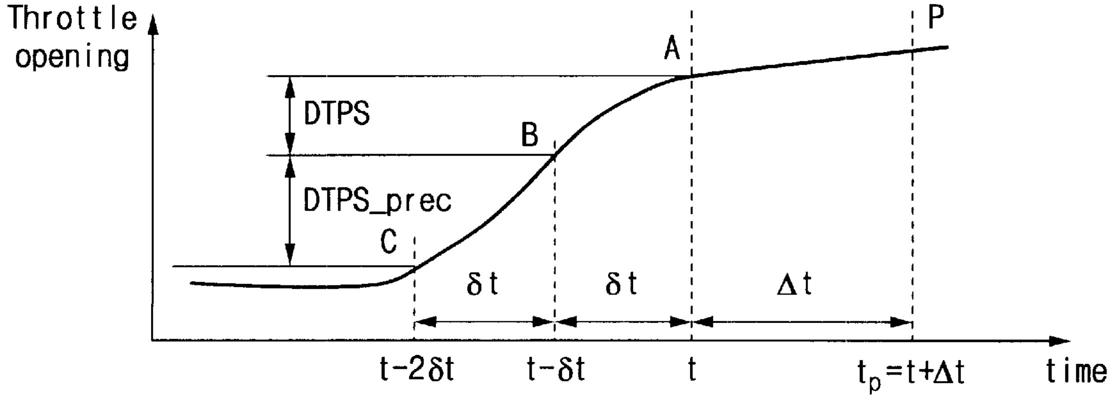
FIG. 4 illustrates definitions of parameters used in the description of an embodiment of the present invention.

FIG. 4 illustrates a situation where the throttle opening TPS is abruptly increased. A preferred embodiment of the present invention is hereinafter described with respect to a case that an air-mass $M_{cyl,P}$ drawn into cylinders at point P is estimated in the case that a current throttle opening is at point A of current time t. Necessary data such as throttle opening TPS and intake-manifold pressure are repeatedly detected at every interval δt. Temporal difference (referred to as "delay period" hereinafter) between the current moment t and the moment $t_p$ of which air-mass drawn into the cylinders must be estimated is denoted as Δt. The moment $t_p$ may be set according to arbitrary criteria by a person skilled in the art, however, the moment $t_p$ is preferably defined as a moment fuel becomes mixed with air in cylinders.

Figure 5:
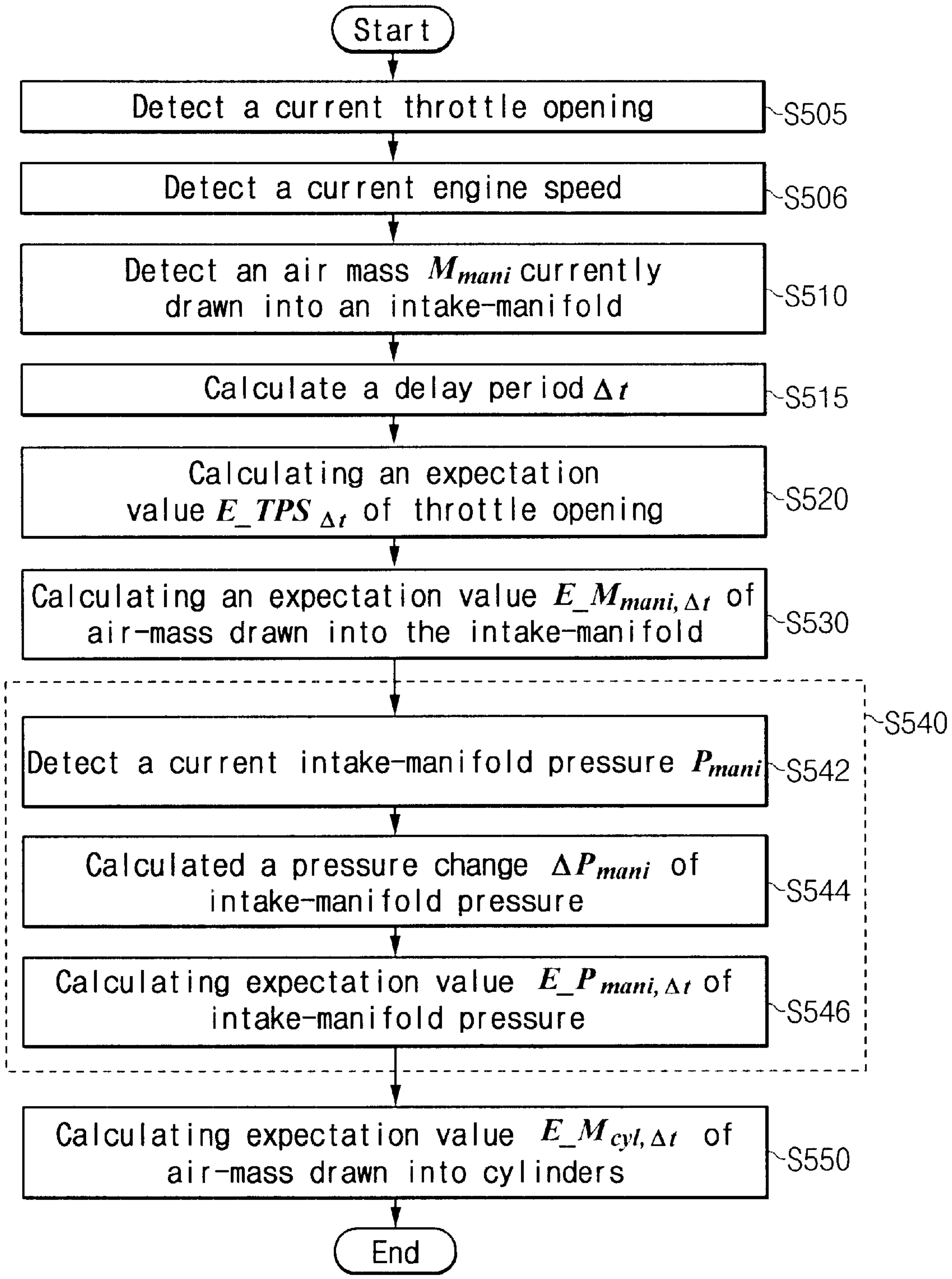
FIG. 5 is a flowchart showing a method for estimating air-mass drawn into cylinders according to an embodiment of the present invention.

FIG. 5 is a flowchart showing a method for estimating air-mass drawn into cylinders according to an embodiment of the present invention. A prefix "E_" in a name of a parameter denotes that the parameter has an expectation value.

The ECU 350 detects a current throttle opening TPS through the throttle opening detector 310 at step S505. The ECU 350 also detects a current engine speed RPM through the engine speed detector 320 at step S506. Subsequently, the ECU 350 detects the air-mass $M_{mani}$ that is currently drawn into an intake-manifold at step S510. The air-mass $M_{mani}$ may be derived from signals of the detectors 310–340 in the art in step S510.

The ECU 350 calculates a delay period Δt at step S515. The delay period Δt denotes a period between a current moment t of injecting fuel and a moment t+Δt when inducted air is drawn into the cylinders. The current moment t is regarded to have a value of zero (0) for purpose of simplification of description. The duration of the delay period Δt depends on the engine RPM. The calculation of the delay period Δt in step S515 may be realized to utilize a lookup table pre-installed in the ECU 350. When the delay period Δt is calculated, the ECU 350 calculates an expectation value $E\_TPS_{\Delta t}$ of the throttle opening after the delay period Δt at step S520.

Figure 6:
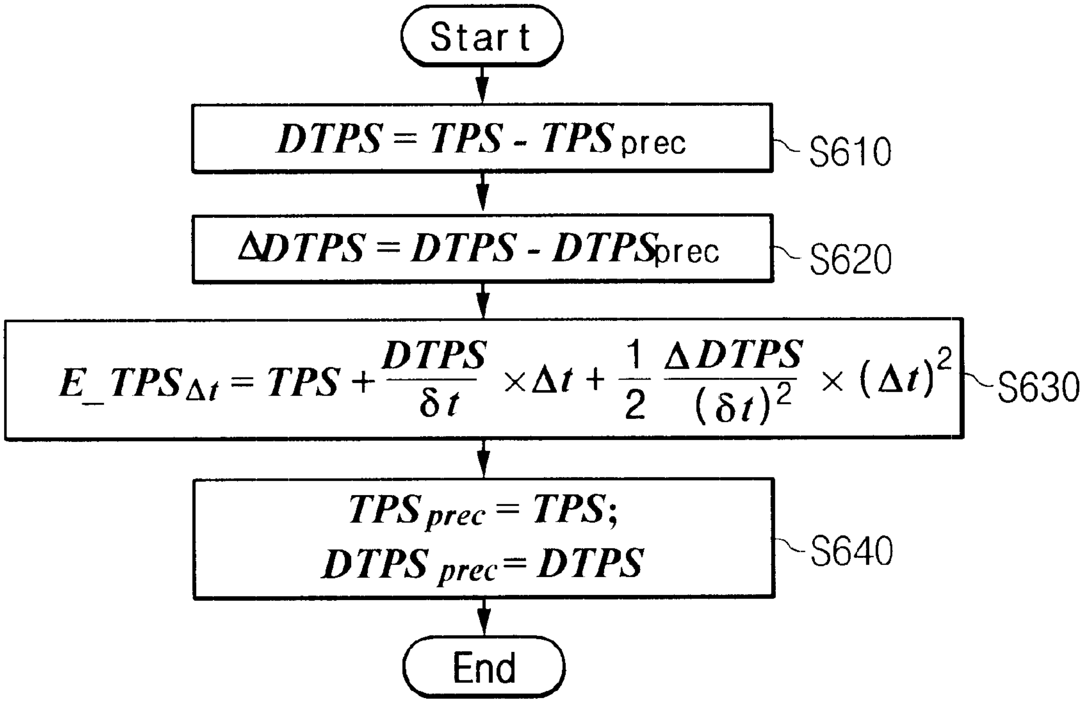
FIG. 6 is a flowchart of step S520, of FIG. 5.

The step S520 of calculating the expectation value $E\_TPS_{\Delta t}$ preferably calculates the same on the basis of Newton's difference method (or equivalently by a Taylor expansion) to a difference term of a predetermined order, which is explained in detail hereinafter with reference to FIG. 6.

First, at step S610, the ECU 350 calculates a difference between the current throttle opening TPS and a previously detected throttle opening $TPS_{prec}$, and stores the difference as a value of a parameter of a first order difference DTPS in throttle opening. That is, the first order difference DTPS in throttle opening is calculated by an equation "$DTPS=TPS-TPS_{prec}$."

Subsequently at step S620, the ECU 350 calculates a difference between the calculated first order difference DTPS and a previously calculated first order difference $DTPS_{prec}$, and stores the difference as a value of a parameter of a second order difference ΔDTPS in throttle opening. That is, the second order difference ΔDTPS in throttle opening is calculated by an equation "$\Delta DTPS=DTPS-DTPS_{prec}$."

Subsequently at step S630, when the first and second order differences are calculated at steps S610 and S620, the ECU 350 calculates the expectation value $E\_TPS_{\Delta t}$ of the throttle opening after the delay period Δt on the basis of the following equation 1.

$$E\_TPS_{\Delta t} = TPS + \frac{DTPS}{\delta t}\times\Delta t + \frac{1}{2}\frac{\Delta DTPS}{(\delta t)^2}\times(\Delta t)^2 \quad \text{(equation 1)}$$

Here, δt denotes a time period between detecting moments of a current and a previous throttle openings TPS and $TPS_{prec}$.

The equation 1 shows a Taylor expansion series to its second order derivative term (or equivalently, a Newton difference equation to its second order difference term), which is obvious to a person skilled in the art and therefore is not described in further detail. Up to second order terms are used in the equation 1, however, higher order terms may obviously be used if needed.

Subsequently at step S640, when the expectation value $E\_TPS_{\Delta t}$ is calculated at step S630, the current throttle opening TPS is stored as the previous throttle opening $TPS_{prec}$, and the current first order difference DTPS is stored as a previous first order difference $DTPS_{prec}$, in order to be used at a next recursion.

Referring back to FIG. 5, when the expectation value $E\_TPS_{\Delta t}$ of throttle opening after the delay period Δt is determined at step S520, the ECU 350 calculates an expectation value $E\_M_{mani,\Delta t}$ of air-mass drawn into the intake-manifold after the delay period Δt, (i.e., air-mass passing through the throttle valve) on the basis of the expectation value $E\_TPS_{\Delta t}$ of throttle opening at step S530. In calculating the expectation value $E\_M_{mani,\Delta t}$ the ECU 350 calculates a base mass $M_{base,\Delta t}$ passing through the throttle valve after the delay period Δt in steps S710–S725, FIG. 7.

In order to calculate the base mass $M_{base,\Delta t}$, the ECU 350 first calculates a ISA mass $M_{ISA}$ passing through an idle speed actuator (ISA) of the throttle valve at step S710. Then at step S715, the ECU 350 calculates a leakage mass $M_{Leak}$ that passes through the throttle valve in the case that the throttle valve is closed.

The ISA mass $M_{ISA}$ has a predetermined value depending on an ISA opening rate, and the leakage mass $M_{Leak}$ also has a predetermined value. The predetermined values of $M_{ISA}$ and $M_{Leak}$, according to specific engines, can be obtained by simple experimentation.

Subsequently at step S720, the ECU 350 calculates a variable mass $M_{var}(E\_TPS_{\Delta t}, RPM)$ that passes through the throttle valve on the basis of the engine speed RPM and the expectation value $E\_TPS_{\Delta t}$ of the throttle opening.

In principle, the RPM must be taken as a value at the time t+Δt. However, the engine speed is taken as a value at the current time t because the engine speed does not significantly changes during a period of the delay period Δt.

The variable mass $M_{var}(E\_TPS_{\Delta t}, RPM)$, denoting an amount of air-mass passing through the throttle valve less the ISA mass $M_{ISA}$ and the leakage mass $M_{Leak}$, may be retrieved from a pre-calculated lookup table. Values of the lookup table regarding specific engines can be obtained from simple experimentation.

Subsequently at step S725, the ECU 350 calculates the base mass $M_{base,\Delta t}$ by adding the ISA mass $M_{ISA}$ and the leakage mass $M_{Leak}$ with the variable mass $M_{var}(E\_TPS_{\Delta t}, RPM)$ When the base mass $M_{base,\Delta t}$ is calculated at step S725, the ECU 350 calculates a correction coefficient $C_T$ on the basis of the air temperature of the intake air temperature $T_{in}$ in steps S730 and S735. Also the ECU 350 calculates a correction coefficient $C_P$ on the basis of a pressure ratio of pressures before and after the throttle valve in steps S740–S755. Subsequently, the ECU 350 modifies the bass mass $M_{base,\Delta t}$ on the basis of the correction coefficients $C_T$ and $C_P$.

In more detail, the ECU 350 first detects the temperature of the air $T_{in}$ drawn into the intake-manifold at step S730. Subsequently, at step S735, the ECU 350 calculates the correction coefficient $C_T$ as a value of $$\sqrt{\frac{T_0}{T_0 + T_{in}}}$$

in which $T_0$ is a predetermined temperature. The predetermined temperature $T_0$, which is a reference temperature, is preferably set as an absolute temperature of zero (0)° C., or 273° K.

Figure 8:
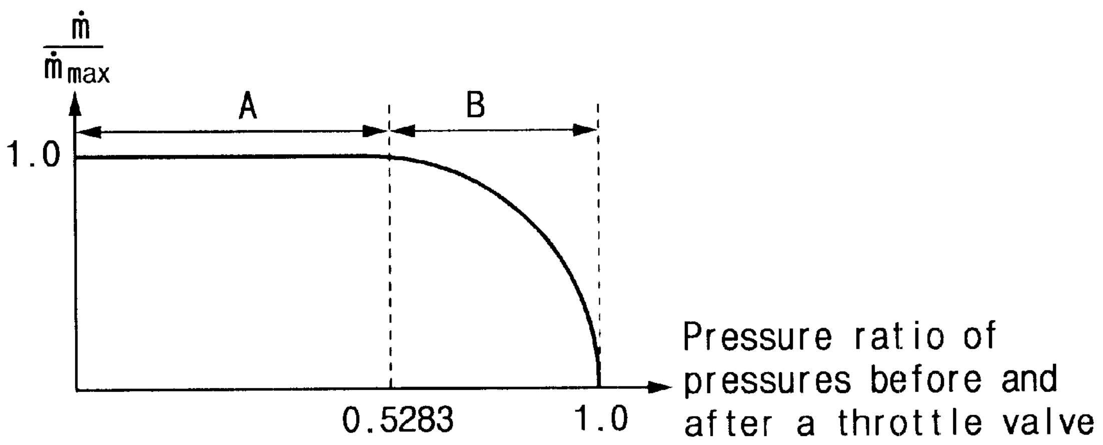
FIG. 8 is a graph illustrating a base mass $M_{base,\Delta t}$ passing through a throttle valve.

The base mass $M_{base,\Delta t}$, passing through a throttle valve is modified and is hereinafter explained with reference to FIG. 8. FIG. 8 shows the relationship of the amount of air passing through the throttle valve to the pressure ratio of pressures taken before and after the throttle valve at specific throttle openings. The vertical axis denotes a normalized amount of air-flow rate, that is, a ratio of $$\frac{\dot{m}}{\dot{m}_{max}},$$

wherein m denotes actual flow rate at the pressure ratio and throttle opening and $m_{max}$ denotes maximum flow rate at the throttle opening. The horizontal axis denotes the pressure ratio of pressures before and after the throttle valve. The maximum flow rate $m_{max}$ corresponds to the calculated base mass $M_{base,\Delta t}$.

As shown in FIG. 8, when the pressure ratio is smaller than a threshold ratio, such as, for example, 0.5283 in FIG. 8, the air flow rate is substantially constant with respect to the pressure ratio. That is, when there is a sufficient pressure difference between the positions before and after the throttle valve the air flow rate is relatively constant. However, as the pressure ratio becomes greater than the threshold ratio, the air flow rate decreases and finally converges to zero (0) at the point where the pressure ratio is 1, or where there is no pressure difference between before and after the throttle valve.

A more detailed description may be seen through reference to Appendix C of "Internal Combustion Engine Fundamentals (McGraw-Hill, John B. Heywood)", which is incorporated by reference in this description.

The base mass $M_{base,\Delta t}$ is therefore, preferably modified especially for pressure ratios greater than the threshold ratio based on a function shown in FIG. 8.

In order to modify the base mass $M_{base,\Delta t}$ on the basis of pressure ratio of pressures before and after the throttle valve, the ECU 350 begins by calculating a temporary expectation value $E\_M_{temp}$ of air-mass drawn into the intake-manifold after the delay period Δt at step S740. In calculating the temporary expectation value $E\_M_{temp}$ the expectation value $E\_M_{temp}$ is calculated by extrapolation on the basis of the current and previous air-mass $M_{mani}$ and $M_{mani,prec}$ drawn into the intake-manifold. The expectation value $E\_M_{temp}$ is calculated by an equation $$\text{“}E\_M_{temp} = M_{mani} + (M_{mani} - M_{mani,prec}) \times \frac{\Delta t}{\delta t}\text{”}.$$

Subsequently at step S745, the ECU 350 calculates an expectation value $E\_P_{TH,\Delta t}$ of pressure before the throttle valve yet after the delay period Δt on the basis of the temporary expectation value $E\_M_{temp}$.

A pressure $P_{TH,\Delta t}$ before the throttle valve, yet after the delay period Δt, decreases by an amount of air-mass passing through the throttle valve and being drawn into the intake-manifold. Therefore, the pressure $P_{TH,\Delta t}$ can be obtained as a function of the air-mass $M_{mani,\Delta t}$ drawn into the intake-manifold after the delay period Δt. The function of $P_{TH,\Delta t}$ with respect to the air-mass $M_{mani,\Delta t}$ is well known to a person skilled in the art, and its values can be retrieved from a pre-installed reference table within the ECU 350. The temporary expectation value $E\_M_{temp}$ is used as the air-mass $M_{mani,\Delta t}$ in a preferred embodiment of the present invention.

The ECU 350 also calculates a temporary expectation value $E\_P_{temp}$ of pressure in the intake-manifold after the delay time Δt by extrapolation on the basis of the current and previous intake-manifold pressures $P_{mani}$ and $P_{mani,prec}$ at step S750. The equation $$\text{“}E\_P_{temp} = P_{mani} + (P_{mani} - P_{mani,prec}) \times \frac{\Delta t}{\delta t}\text{”}$$

is used for the extrapolation. When the expectation values $E\_P_{TH,\Delta t}$ and $E\_P_{temp}$ are calculated at steps S745 and S750, respectively, the ECU 350 calculates the correction coefficient $C_P$ at step S755. In more detail, at step S755, the correction coefficient $C_P$ is calculated by the equation $$C_P = C_P\left(\frac{E\_P_{temp}}{E\_P_{TH,\Delta t}}\right),$$

where the function $C_P(x)$, x being a pressure ratio, is defined to have the pattern shown in FIG. 8. Values of the function $C_P(x)$ are calculated and preinstalled in the ECU 350 in the form of a reference table.

The function $C_P(x)$ is defined, for example, as $$C_P\left(\frac{P_2}{P_1}\right) = \sqrt{\frac{2k}{k-1}P_1\left\{P_1\left(\frac{P_2}{P_1}\right)^{2/k} - \left(\frac{P_2}{P_1}\right)^{(k+1/k)}\right\}}.$$

Here, k is a specific heat ratio (ratio of a constant volume specific heat to a constant pressure specific heat. The value of which is approximately 1.4 for air, and approximately 1.26–1.27 for the fuel-air mixture.

Figure 7:
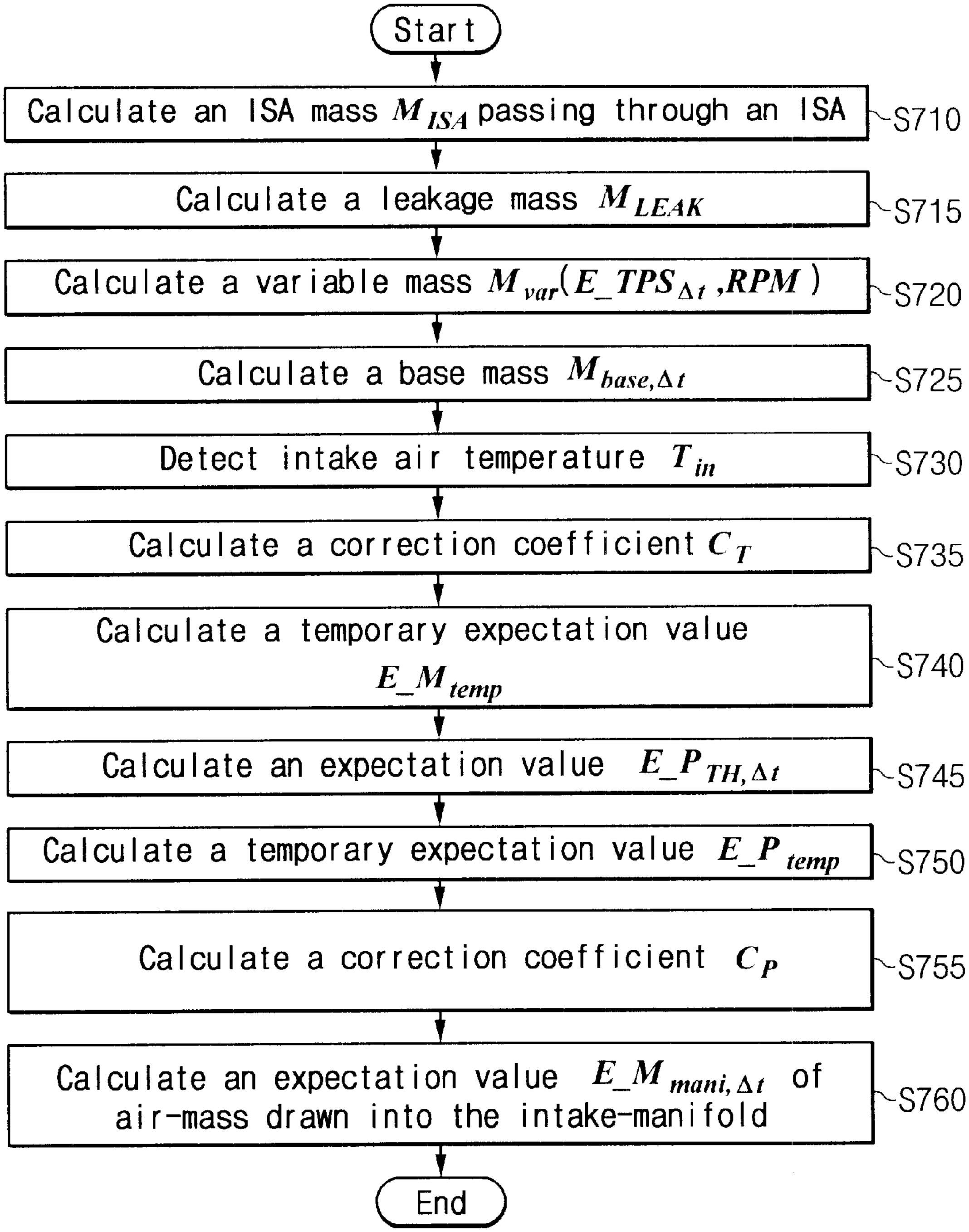
FIG. 7 is a flowchart of step S530, of FIG. 5.

When the base mass $M_{base,\Delta t}$ correction coefficients $C_T$ and $C_P$ are calculated, the ECU 350 calculates the expectation value $E\_M_{mani,\Delta t}$ of air-mass drawn into the intake-manifold after the delay period Δt by multiplying all of them together at step S760, FIG. 7.

Referring back to FIG. 5, when the expectation value E $M_{mani,\Delta t}$ of air-mass drawn into the intake-manifold is calculated at step S530, the ECU 350 calculates an expectation value $E\_P_{mani,\Delta t}$ of intake-manifold pressure after the delay period Δt at step S540. In more detail, the ECU 350 first detects a current intake-manifold pressure $P_{mani}$ at step S542. In addition, the ECU 350 calculates a pressure change $^{\Delta P}{}_{mani}$ as a value of "$(E\_M_{mani,\Delta t} - M_{mani}) \times R \times T_{in}/V_S$" at step S544. In the above formula for $\Delta P_{mani}$, R denotes a gas constant, and $V_S$ denotes an effective volume of an intake-manifold. The above formula to calculate the pressure change $\Delta P_{mani}$ is obvious from the ideal gas state equation.

Subsequently at step S546, the ECU 350 calculates the expectation value $E\_P_{mani,\Delta t}$ of the intake-manifold pressure by adding the pressure change $\Delta P_{mani}$ to the detected current intake-manifold pressure $P_{mani}$. When the expectation value $E\_P_{mani,\Delta t}$ of intake-manifold pressure is calculated at step S540, the ECU 350 then calculates an expectation value $E\_M_{cyl,\Delta t}$ of air-mass drawn into cylinders after the delay period Δt at step S550. The expectation value $E\_M_{cyl,\Delta t}$ is calculated according to equation 2 shown below.

$$E\_M_{cyl,\Delta t} = K(\text{RPM}) \times (E\_P_{mani,\Delta t} - P_{rig}(\text{RPM})) \quad \text{(equation 2)}$$

The parameter $P_{rig}$(RPM) implies a pressure of resident (not exhausted) gas in cylinders, the values of which can be calculated based on an engine speed and also be preinstalled in the ECU 350 in the form of a reference table. The parameter K(RPM) implies that air-mass $M_{cyl,\Delta t}$ drawn into cylinders is proportional to the intake-manifold pressure, of which the proportionality depends on the speed of the engine. The values of the parameter K(RPM) can be calculated based on engine speed and also be preinstalled in the ECU 350 in the form of a reference table.

Figure 9:
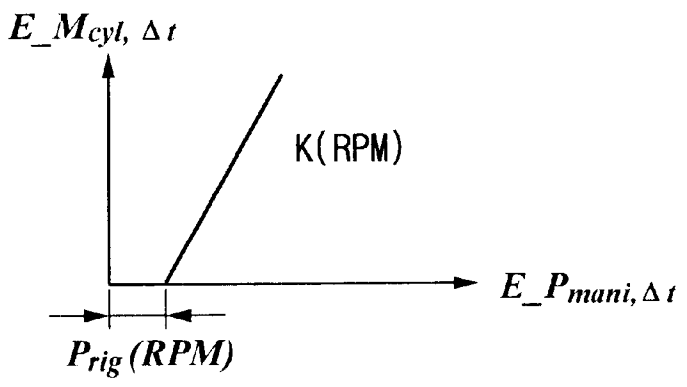
FIG. 9 illustrates a relationship between an expectation value $E\_M_{mani,\Delta t}$ of air-mass drawn into the intake-manifold and an expectation value $E\_M_{cyl,\Delta t}$ of air-mass drawn into cylinders according to a preferred embodiment of the present invention.

As can be gathered from the equation 2, the expectation value $E\_M_{cyl,\Delta t}$ is proportional to the expectation value $E\_P_{mani,\Delta t}$, which is graphically shown in FIG. 9.

The parameters $P_{rig}$(RPM) and K(RPM), being functions of RPM, may vary depending on different engines. However, for specific engines, the values can be obtained through simple experimentation.

A fuel control method of an engine according to an embodiment of the present invention using the above described method and system for estimating air-mass drawn into cylinders is hereinafter described.

Figure 10:
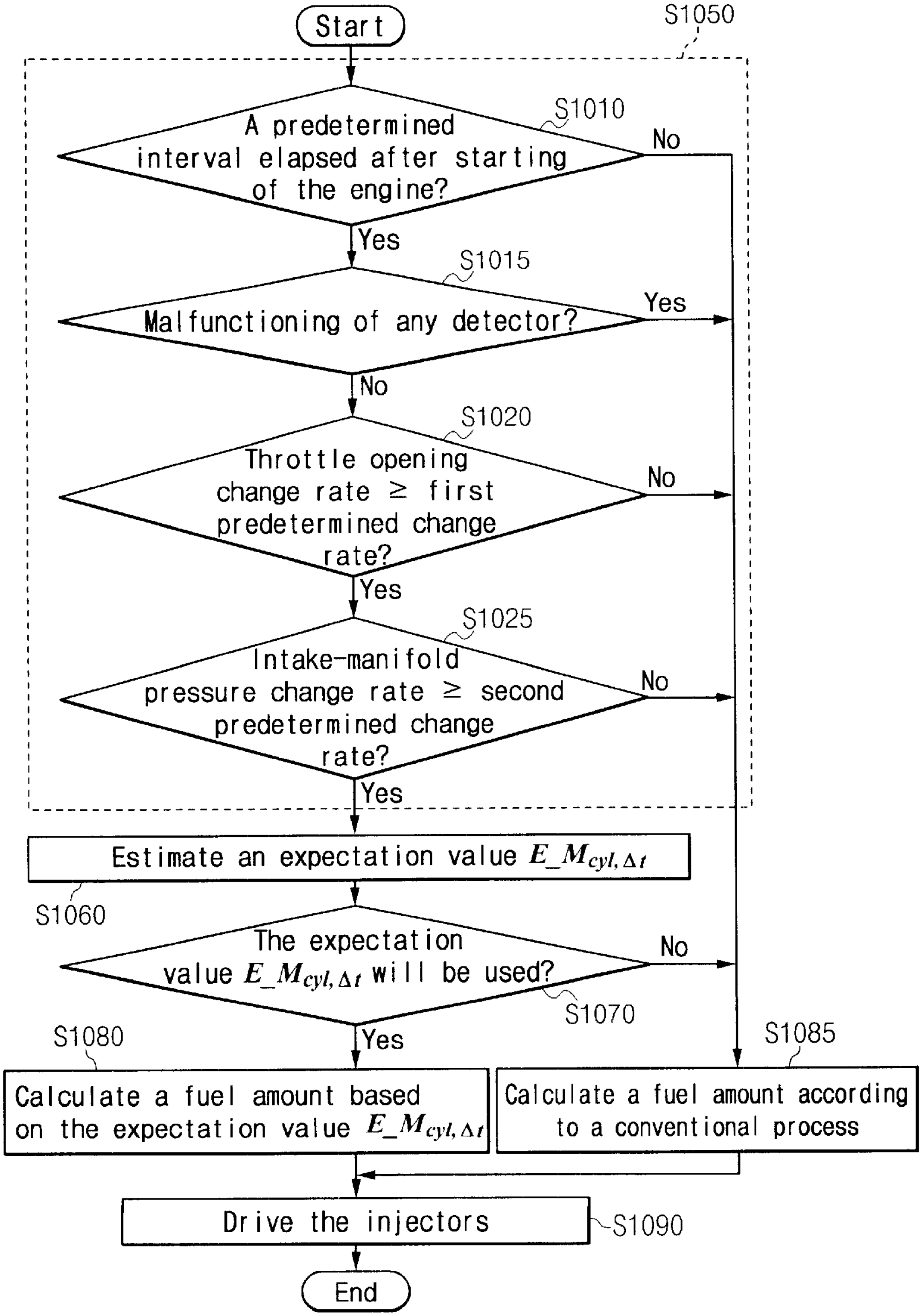
FIG. 10 is a flowchart showing a fuel control method of an engine according to an embodiment of the present invention.

FIG. 10 shows first, at step S1050, the ECU 350 determines if a predetermined condition is satisfied. When the predetermined condition is satisfied, the ECU 350 estimates an expectation value $E\_M_{cyl,\Delta t}$ of cylinder intake air-mass after the delay period Δt at step S1060. Subsequently, at step S1070, the ECU 350 determines if the estimated expectation value $E\_M_{cyl,\Delta t}$ will be used. When it is determined that the expectation value $E\_M_{cyl,\Delta t}$ is to be used, at step S1070, the ECU 350 calculates a fuel amount based on the estimated expectation value $E\_M_{cyl,\Delta t}$ at step S1080 and subsequently drives the fuel injectors 360 based on the calculated fuel amount at step S1090.

The predetermined condition is satisfied when a predetermined interval has passed following the starting of the engine (S1010-yes) and no malfunctioning of the throttle opening detector 310, the engine speed detector 320, the intake-manifold pressure detector 330, and the intake air temperature detector 340 occurs (S1015-no). Also, the change rate of the throttle opening is greater than a first predetermined change rate (S1020-yes), and the change rate of the intake-manifold pressure is greater than a second predetermined change rate (S1025-yes). When the predetermined condition is satisfied, the ECU 350 estimates the expectation value $E\_M_{cyl,\Delta t}$ at step S1060 according to a method for estimating the air-mass drawn into cylinders an embodiment of the present invention described above with reference to FIG. 4.

When the expectation value $E\_M_{cyl,\Delta t}$ is calculated at step S1060, the ECU 350 determines, at step S1070, if the estimated expectation value $E\_M_{cyl,\Delta t}$ will be used for calculation of the amount of fuel to be injected.

In step S1070, the ECU 350 determines if a difference between the estimated expectation value $E\_M_{cyl,\Delta t}$ and a current air-mass $M_{mani}$ drawn into the intake-manifold is greater than a predetermined value. The ECU 350 also determines if the estimated expectation value $E\_M_{cyl,\Delta t}$ will be used. The estimated expectation value $E\_M_{cyl,\Delta t}$ will be used if the difference between $E\_M_{cyl,\Delta t}$ and $M_{mani}$ is greater than the predetermined value. The predetermined value may be set as a specific value believed to be appropriate for a specific engine.

When it is determined that the expectation value $E\_M_{cyl,\Delta t}$ is to be used, at step S1070, the ECU 350 calculates the amount of fuel to be infected based on the expectation value $E\_M_{cyl,\Delta t}$ at step S1080. When it is determined that the expectation value $E\_M_{cyl,\Delta t}$ is not to be used, at step S1070, the ECU 350 calculates the amount of fuel to be injected according to conventional process at step S1085.

The step S1080, of calculating the fuel amount, which is a step of calculating a fuel amount based on air-mass, is obvious to a person skilled in the art, and therefore is not described in further detail. When the fuel amount is calculated at step S1080, the ECU 350 drives the fuel injectors 360 based on the fuel amount at step S1090.

While this invention has been described in connection with what is presently considered to be the most practical and preferred embodiments, it is to be understood that the invention is not limited to the disclosed embodiments, but, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for estimating air-mass drawn into cylinders comprising:

detecting a current throttle opening TPS;

detecting a current engine speed RPM;

detecting an air mass $M_{mani}$ currently drawn into an intake-manifold;

calculating a delay period Δt of from injecting fuel to a predetermined target moment;

calculating an expectation value $E\_TPS_{\Delta t}$ of throttle opening after the delay period Δt;

calculating an expectation value $E\_M_{mani,\Delta t}$ of air-mass drawn into the intake-manifold after the delay period Δt on the basis of the expectation value $E\_TPS_{\Delta t}$ of throttle opening;

calculating an expectation value $E\_P_{mani,\Delta t}$ of intake-manifold pressure after the delay period Δt on the basis of the expectation value $E\_M_{mani,\Delta t}$ of air-mass drawn into the intake-manifold; and calculating an expectation value $E\_M_{cyl,\Delta t}$ of air-mass drawn into cylinders after the delay period Δt on the basis of the expectation value $E\_P_{mani,\Delta t}$ of intake-manifold pressure.

2. The method of claim 1, wherein said calculating expectation value $E\_TPS_{\Delta t}$ of throttle opening calculates the expectation value $E\_TPS_{\Delta t}$ on the basis of Newton's difference method to a predetermined order difference terms.

3. The method of claim 1, wherein said calculating expectation value $E\_TPS_{\Delta t}$ of throttle opening comprises:

calculating a first order difference DTPS of the throttle opening;

calculating a second order difference ΔDTPS of the throttle opening; and calculating the expectation value $E\_TPS_{\Delta t}$ of the throttle opening on the basis of an equation $$E\_TPS_{\Delta t} = TPS + \frac{DTPS}{\delta t} \times \Delta t + \frac{1}{2}\frac{\Delta DTPS}{(\delta t)^2} \times (\Delta t)^2,$$

wherein δt denotes a time period between detecting moments of a current throttle opening TPS and a previous throttle opening $TPS_{prec}$.

4. The method of claim 1, wherein said calculating expectation value $E\_M_{mani,\Delta t}$ of air-mass drawn into the intake-manifold comprises:

calculating a base mass $M_{base,\Delta t}$ passing through the throttle valve on the basis of an engine speed RPM and the expectation value $E\_TPS_{\Delta t}$ of throttle opening;

detecting the temperature of air $T_{in}$ drawn into the intake-manifold;

calculating a correction coefficient $C_T$ corresponding to the intake air temperature $T_{in}$;

calculating a correction coefficient $C_P$ corresponding to a pressure ratio of pressures before and after the throttle valve after the delay time Δt; and calculating the expectation value $E\_M_{mani,\Delta t}$ of air-mass drawn into the intake-manifold by modifying the base mass $M_{base,\Delta t}$ based on the correction coefficients $C_T$ and $C_P$.

5. The method of claim 4, wherein said calculating a correction coefficient $C_T$ calculates the correction coefficient $C_T$ as a value of $$\sqrt{\frac{T_0}{T_0 + T_{in}}}$$

on the basis of a predetermined temperature $T_0$ and the intake air temperature $T_{in}$.

6. The method of claim 4, wherein said calculating a correction coefficient $C_P$ corresponding to a pressure ratio comprises:

calculating a temporary expectation value $E\_M_{temp}$ of air-mass drawn into the intake-manifold after the delay period Δt by extrapolation;

calculating an expectation value $E\_P_{TH,\Delta t}$ of pressure before the throttle valve on the basis of the temporary expectation value $E\_M_{temp}$; and calculating an expectation value $E\_P_{temp}$ of pressure in the intake-manifold after the delay time Δt by extrapolation.

7. The method of claim 4, wherein said calculating a correction coefficient $C_P$ corresponding to a pressure ratio calculates the correction coefficient $C_P$ on the basis of a function which monotonically decreases above a threshold pressure ratio and converges to 0 at a predetermined pressure ratio.

8. The method of claim 1, wherein said calculating expectation value $E\_P_{mani,\Delta t}$ of intake-manifold pressure after the delay period Δt comprises:

detecting a current intake-manifold pressure $P_{mani}$;

calculating intake-manifold pressure change $\Delta P_{mani}$ as a value of "$(E\_M_{mani,\Delta t} - M_{mani}) \times R \times T_{in}/V_s$"; and calculating the expectation value $E\_P_{mani,\Delta t}$ of the intake-manifold pressure by adding the detected current intake-manifold pressure $P_{mani}$ and the pressure change $\Delta P_{mani}$.

9. The method of claim 1, wherein said calculating expectation value $E\_M_{cyl,\Delta t}$ of cylinder intake air-mass calculates the expectation value $E\_M_{cyl,\Delta t}$ of cylinder intake air-mass as a value of an equation $E\_M_{cyl,\Delta t} = K(RPM) \times E\_P_{mani,\Delta t} + P_{rig}(RPM)$, wherein $P_{rig}(RPM)$ and K(RPM) are predetermined functions of engine speed RPM.

10. A system for estimating cylinder intake air-mass comprising:

a throttle opening detector for detecting throttle opening;

an engine speed detector for detecting engine speed;

an intake-manifold pressure detector for detecting intake-manifold pressure;

an intake air temperature detector for detecting air temperature drawn into an intake manifold; and an electronic control unit for calculating air-mass drawn into cylinders based on signals of the throttle opening detector, the engine speed detector, the intake-manifold pressure detector, and the intake air temperature detector, wherein the electronic control unit is programmed to execute instructions for:

detecting a current throttle valve opening TPS;

detecting a current engine speed RPM;

detecting a current intake-manifold intake air mass $M_{mani}$;

calculating a delay period Δt of from injecting fuel to a predetermined target instance;

calculating expectation value $E\_TPS_{\Delta t}$ of throttle opening after the delay period Δt;

calculating expectation value $E\_M_{mani,\Delta t}$ of air-mass drawn into an intake-manifold after the delay period Δt on the basis of the expectation value $E\_TPS_{\Delta t}$ of throttle opening;

calculating expectation value $E\_P_{mani,\Delta t}$ of intake-manifold pressure after the delay period Δt on the basis of the expectation value $E\_M_{mani,\Delta t}$ of air-mass drawn into the intake-manifold; and calculating expectation value $E\_M_{cyl,\Delta t}$ of cylinder intake air-mass after the delay period Δt on the basis of the expectation value $E\_P_{mani,\Delta t}$ of intake-manifold pressure.

11. A fuel control method of an engine comprising:

determining if a predetermined condition is satisfied;

estimating an expectation value $E\_M_{cyl,\Delta t}$ of cylinder intake air-mass after the delay period Δt according to a method comprising:

detecting a current throttle opening TPS;

detecting a current engine speed RPM;

detecting a current intake-manifold intake air mass $M_{mani}$;

calculating a delay period Δt of from injecting fuel to a predetermined target instance;

calculating an expectation value $E\_TPS_{\Delta t}$ of throttle opening after the delay period Δt;

calculating an expectation value $E\_M_{mani,\Delta t}$ of air-mass drawn into an intake-manifold after the delay period Δt on the basis of the expectation value $E\_TPS_{\Delta t}$ of throttle opening;

calculating an expectation value $E\_P_{mani,\Delta t}$ of intake-manifold pressure after the delay period Δt on the basis of the expectation value $E\_M_{mani,\Delta t}$ of air-mass drawn into the intake-manifold; and calculating the expectation value $E\_M_{cyl,\Delta t}$ of cylinder intake air-mass after the delay period Δt on the basis of the expectation value $E\_P_{mani,\Delta t}$ of intake-manifold pressure;

calculating a fuel amount based on the estimated expectation value $E\_M_{cyl,\Delta t}$; and driving injectors based on the calculated fuel amount.

12. The method of claim 11, wherein the predetermined condition is satisfied when a predetermined interval has passed after starting the engine, and no malfunctioning of a throttle opening detector, an engine speed detector, an intake-manifold pressure detector, and an intake air temperature detector occurs, a change rate of the throttle opening is greater than a first predetermined change rate, and a change rate of the intake-manifold pressure is greater than a second predetermined change rate.

13. The method of claim 11, further comprising determining if a difference between the estimated expectation value $E\_M_{cyl,\Delta t}$ and a current air-mass drawn into the intake-manifold $M_{mani}$ is greater than a predetermined value, wherein said calculating a fuel amount based on the estimated expectation value $E\_M_{cyl,\Delta t}$ is executed when the difference is greater than the predetermined value.

14. A fuel control system of an engine comprising:

a throttle opening detector for detecting throttle opening;

an engine speed detector for detecting engine speed;

an intake-manifold pressure detector for detecting intake-manifold pressure;

an intake air temperature detector for detecting air temperature drawn into an intake manifold;

injectors for injecting fuel into the engine; and an electronic control unit for calculating fuel amount based on signals of the throttle opening detector, the engine speed detector, the intake-manifold pressure detector, and the intake air temperature detector and for driving the injectors based on the calculated fuel amount, wherein the electronic control unit is programmed to execute instructions for:

determining if a predetermined condition is satisfied;

estimating an expectation value $E\_M_{cyl,\Delta t}$ of cylinder intake air-mass after the delay period Δt according to a method comprising:

detecting a current throttle opening TPS;

detecting a current engine speed RPM;

detecting a current intake-manifold intake air mass $M_{mani}$;

calculating a delay period Δt of from injecting fuel to a predetermined target instance;

calculating an expectation value $E\_TPS_{\Delta t}$ of throttle opening after the delay period Δt;

calculating an expectation value $E\_M_{mani,\Delta t}$ of air-mass drawn into an intake-manifold after the delay period Δt on the basis of the expectation value $E\_TPS_{\Delta t}$ of throttle opening;

calculating an expectation value $E\_P_{mani,\Delta t}$ of intake-manifold pressure after the delay period Δt on the basis of the expectation value $E\_M_{mani,\Delta t}$ of air-mass drawn into the intake-manifold; and calculating the expectation value $E\_M_{cyl,\Delta t}$ of cylinder intake air-mass after the delay period Δt on the basis of the expectation value $E\_P_{mani,\Delta t}$ of intake-manifold pressure;

calculating a fuel amount based on the estimated expectation value $E\_M_{cyl,\Delta t}$; and driving injectors based on the calculated fuel amount.

* * * * *